UNITED STATES PATENT OFFICE.

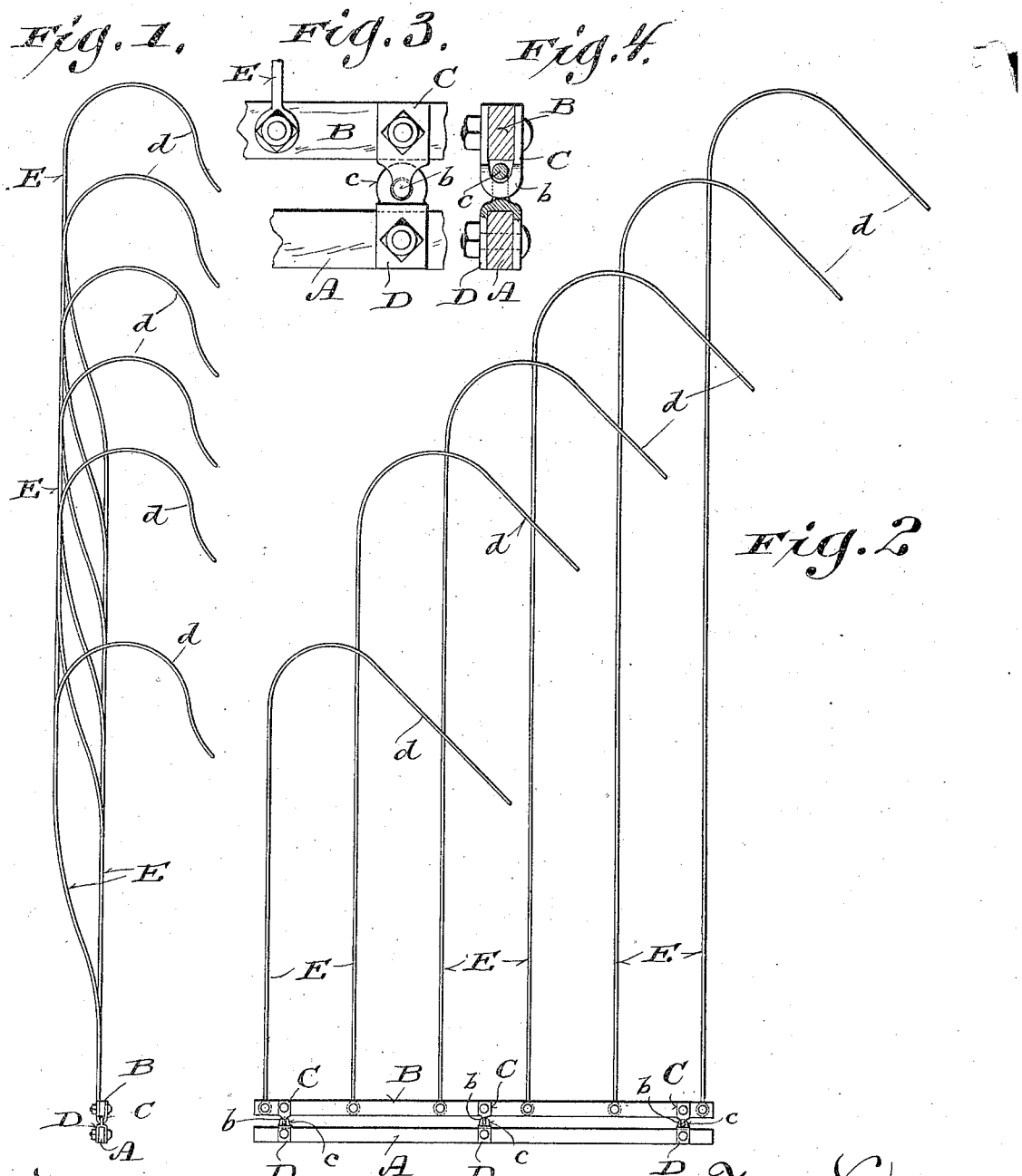

THEODORE NAUS, OF MANITOWOC, WISCONSIN.

MOWER ATTACHMENT.

SPECIFICATION forming part of Letters Patent No. 604,779, dated May 31, 1898.

Application filed September 1, 1897. Serial No. 650,277. (No model.)

*To all whom it may concern:*

Be it known that I, THEODORE NAUS, a citizen of the United States, and a resident of Manitowoc, in the county of Manitowoc and State of Wisconsin, have invented certain new and useful Improvements in Mower Attachments; and I do hereby declare that the following is a full, clear, and exact description thereof.

My invention has for its object to provide a simple economical mower attachment for the discharge of cut pea-vines in rows a suitable distance away from the path of the machine, whereby premature threshing of the pea-pods is prevented; and it consists in certain peculiarities of construction and combination of parts hereinafter set forth with reference to the accompanying drawings and subsequently claimed.

Figure 1 of the drawings represents a side view of my improved mower attachment in connection with a finger-bar; Fig. 2, a plan view of the same; Fig. 3, a detail plan view, on an enlarged scale, illustrating one of the shackle-joints connecting my attachment with the finger-bar of a mower, the parts being inverted; and Fig. 4, a transverse sectional view of the parts shown in the preceding figure.

Referring by letter to the drawings, A represents the finger-bar of a mower, and B another bar that constitutes part of my attachment. Bolted to the latter bar at suitable intervals apart are clips C, each of which has a vertically-disposed eye $b$, engaged by a horizontally-disposed eye $c$ of another clip D, that has detachable bolt connection with the sickle-bar.

Bolted or otherwise rigidly connected to bar B at suitable intervals apart are a series of rearwardly-extended rods E, bent below said bar a short distance therefrom to have a considerable portion of each rest upon the ground over which they are drawn. The rods are also recurved at the rear to form guards $d$, that overhang cut pea-vines, and said rods are of gradually-decreased length toward the outer end of the bar B, to which they are attached, the guard portion of the outermost rod being preferably longer than similar portions of the other rods.

Cut pea-vines fall back on the bent-down portions of rods E and virtually lie on the ground as these rods move ahead, whereby a resistance is had that starts said cut vines to rolling as soon as the overhanging recurved guard ends $d$ of said rods come in contact therewith. Rolling motion having been imparted to the swath of vines, the mass will move toward the innermost longest one of rods E and finally discharge in a row back of the mower.

The eye-clips C D, connected as above described, constitute shackle-joints, and owing to these joints the attachment as a whole is not affected in the matter of vertical or lateral position by tilt or sway of the finger-bar incidental to the travel of the mower over more or less rough ground, this being an important feature of said attachment.

Having thus described my invention, what I claim as new, and desire to secure by Letters Patent, is—

An attachment comprising a bar provided with a series of shackle-joints for vertically-yielding connection with a mower finger-bar in rear of the same, and a series of different-length rods that are rigidly connected to the former bar at intervals thereof, bent below the same a short distance therefrom to have a considerable portion of each rest on the ground and recurved at the rear to form overhanging guards.

In testimony that I claim the foregoing I have hereunto set my hand, at Manitowoc, in the county of Manitowoc and State of Wisconsin, in the presence of two witnesses.

THEODORE NAUS.

Witnesses:
 LOUIS SHOUP,
 JACOB STUEBER.